United States Patent [19]

Ahrens et al.

[11] Patent Number: 5,137,551

[45] Date of Patent: Aug. 11, 1992

[54] EXTRACTION METHOD AND APPARATUS

[75] Inventors: Frederick Ahrens, Hortonville; James Loughran, Appleton; James Benson, Neenah, all of Wis.

[73] Assignee: James River Corporation of Virginia, Richmond, Va.

[21] Appl. No.: 811,917

[22] Filed: Dec. 23, 1991

Related U.S. Application Data

[63] Continuation of Ser. No. 626,679, Dec. 12, 1990, abandoned.

[51] Int. Cl.$^5$ .............................................. B01D 47/00
[52] U.S. Cl. ........................................ 55/87; 55/178; 55/440
[58] Field of Search ................... 55/87, 178, 186, 440

[56] References Cited

U.S. PATENT DOCUMENTS

| | | | |
|---|---|---|---|
| 3,413,778 | 12/1968 | Lavery et al. | 55/186 |
| 3,716,449 | 2/1973 | Gatward et al. | |
| 3,871,952 | 3/1975 | Robertson . | |
| 3,937,273 | 2/1976 | Radvan et al. | |
| 3,938,782 | 2/1976 | Robertson . | |
| 3,947,315 | 3/1976 | Smith . | |
| 3,963,463 | 6/1976 | Huppke | 55/178 |
| 4,342,570 | 8/1982 | Marjollet et al. | 55/440 X |
| 4,443,297 | 4/1984 | Cheshire et al. | |
| 4,443,299 | 4/1984 | Cheshire et al. | |
| 4,488,932 | 12/1984 | Eber et al. | |
| 4,498,956 | 2/1985 | Cheshire et al. | |
| 4,543,156 | 9/1985 | Cheshire et al. | |
| 4,686,006 | 8/1987 | Cheshire et al. | |
| 4,713,092 | 12/1987 | Kikuchi et al. | 55/440 X |
| 4,764,253 | 8/1988 | Cheshire et al. | |
| 4,869,782 | 9/1989 | Nelson et al. | |
| 4,954,148 | 9/1990 | Alexander | 55/440 X |
| 4,975,101 | 12/1990 | Swanborn | 55/440 |

OTHER PUBLICATIONS

"Foam Columns for Countercurrent Surface-Liquid Extraction of Surface-Active Solutes," published in A.I. Ch. E. Journal dated Mar., 1965, pp. 319,322, and 323.
Pilot Plant Studies of the Decontamination of Low--Level Process Waste by a "Scavenging-Precipitation Foam Separation Process," Oak Ridge National Laboratory, U.S. Atomic Energy Commission, p. 5.
"A Model and Experimental Results for Drainage of Solution Between Foam Bubbles", I&EC Fundamentals, vol. 6, No. 2, May 1967, pp. 225-233.
"Sheet Formation & Printability," by B. Radvan et al, presented at the 14th EUCEPA Conference in Oct., 1971.
"Wet-Laid, Long Fiber Formers," by A. P. J. Gatward, published in *Paper Technology*, vol. 13, No. 4, dated Aug., 1972.
"The Structure and Properties of Paper Formed by a Foaming Process," by M. K. Smith et al, *TAPPI*, vol. 57, No. 1, Jan. 1974.
"Long-Fibre Developments in U.K. & Europe," by A. P. J. Gatward, published in *Paper Technology*, vol. 14, No. 5, Oct., 1973.
"New Developments in the Radfoam Process," by R. W. Tringham, published in *Paper Technology*, Oct., 1974, vol. 15, No. 5, pp. 288-294.

*Primary Examiner*—Charles Hart

[57] ABSTRACT

A method and apparatus for separating surfactant depleted liquid from an at least partially stable foamed aqueous admixture of water, surfactant and air includes introducing the at least partially stable foamed admixture to a channel of preselected height, length, width and inclination at such a flow rate as the foamed admixture passes through the channel. A substantially translational motion of the foamed admixture is maintained through the bulk of the channel. As the foamed admixture translates through the channel, surfactant depleted liquid drains from the interstices thereof. The air content of the foamed admixture does not increase above the air content at which substantial overdrying begins to occur in the foamed admixture. Tranquil interface flow conditions are maintained in the flow of surfactant depleted liquid drained from the foamed admixture for so long as it is in contact with the admixture. Separation of the surfactant depleted liquid from the foamed admixture is carried out by the method and apparatus of the present invention.

32 Claims, 3 Drawing Sheets

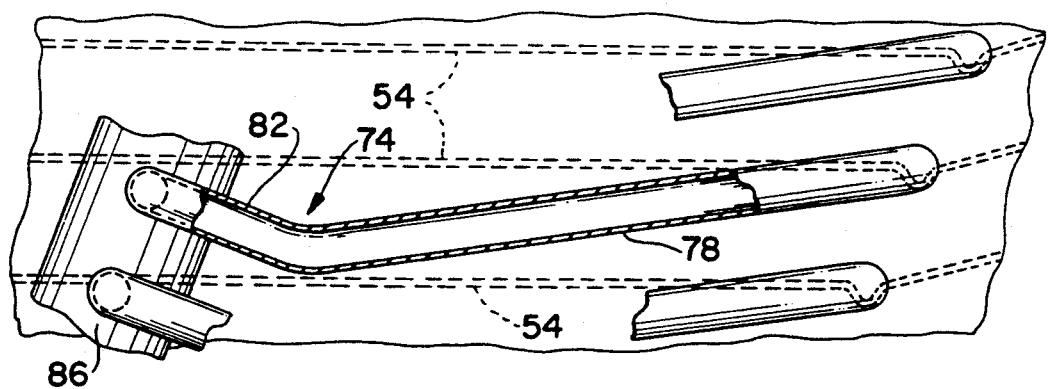
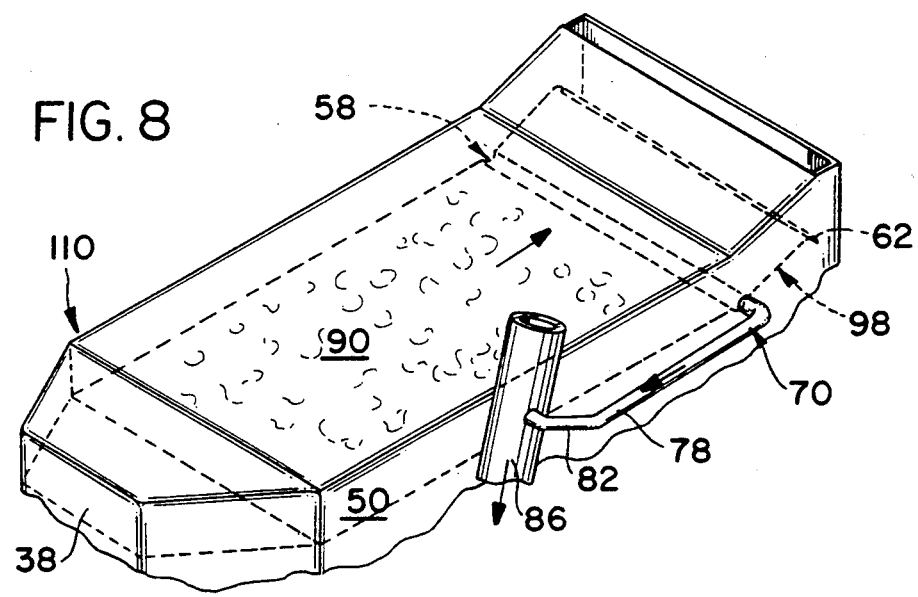
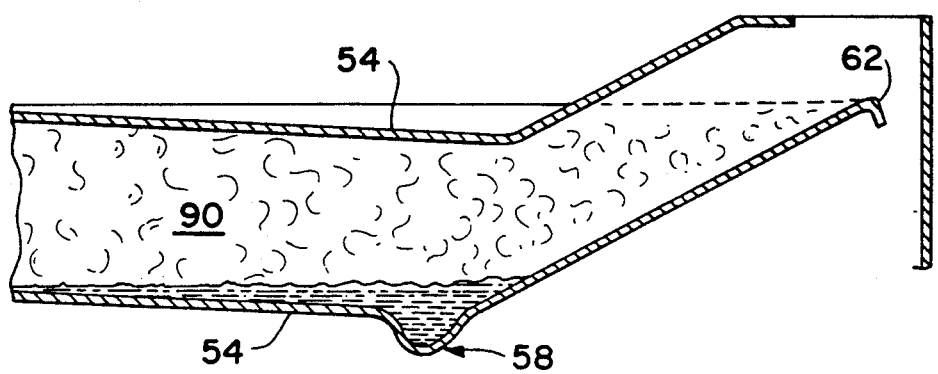

EXTRACTION METHOD AND APPARATUS

This application is a continuation of application Ser. No. 07/626,679 filed on Dec. 12, 1990, now abandoned.

Handling foam properly can be much like jiu-jitsu; timing and control guided by understanding is far more effective than undisciplined application of brute force. Enriching a wet foam by extracting surfactant depleted liquid has previously required mammoth vessels to obtain even unimpressive partition. The method and apparatus of the present invention can achieve useful extractions in continuous flow using compact equipment with only routine instrumentation.

We extract surfactant depleted liquid from a moderately stable foamed admixture by passing the foamed admixture at a controlled rate within a predetermined range through a shallow, wide drainage channel of critically controlled configuration. Liquid drains from the foam in the channel, flows along the bottom of the channel and is separated from the dried foam. Proper flow conditions in the channel are key. By properly dimensioning the channel for the range of expected streams of wet foam, translational flow of foam can be approximated through the bulk of the channel.

In translational flow, foam slides through the channel without rearranging its internal structure; thus, bubbles in the foam do not move relative to each other but merely "translate" through the channel. As foam translates through the channel, liquid which is relatively depleted of surfactant drains from the foam and accumulates to form a stream at the bottom of the channel. By proper choice of the height, length, width and inclination of the channel, it is possible to cause flows of foam within the expected range not only to approach translational but also to proceed at such a rate that the foam will not be "over-dried" before it reaches the point at which it is separated from the surfactant depleted underflow. So long as the foam does not become greatly overdried, substantial variations in flow rate can be tolerated so long as the concentration of surfactant in the foam is suitable for the desired use.

As a foam drains, the concentration of surfactant in the drained liquid is relatively low at the beginning of the process. As the process continues, this relatively low concentration of surfactant is maintained for an extended period of time until the foam becomes "over-dried", at which time, coalescence of bubbles in the foam has freed surfactant, disrupted established flow patterns and caused the concentration of surfactant in the interstitial liquid being drained to increase. Since coalescence first occurs at the top of the foam, some time is required for the effect of coalescence to become apparent in the drained liquid. Overdrying is said to occur when the effects of coalescence become manifest in the liquid underflow by an increase in the concentration of surfactant therein. Thus, another key to the present process is to control channel geometry such that drained foam is separated from the liquid underflow before the concentration of surfactant in the drained liquid increases as a result of the foam becoming over-dried. Both translational flow and avoidance of overdrying are directed to achieving the same end, limiting coalescence in the foam and thus limiting the concentration of surfactant in the drained liquid.

After surfactant depleted liquid has drained from the foam, for so long as the liquid is in contact with the foam, to prevent excessive entrainment of air bubbles by the liquid, a passive, quiescent or tranquil interface should be maintained therebetween by control of the flow conditions in the liquid stream as entrainment of bubbles will lead to increased concentration of surfactant in the drained liquid. Thus, the length of the flow path as well as its depth, inclination and configuration should be such that entrainment inducing discontinuities such as "whirlpools", "waterfalls" and "rapids" are avoided and the surface of the liquid underflow remains tranquil and does not become turbulent before the liquid and foam are separated from each other. We term such flow conditions "tranquil interface flow conditions." In many cases, tranquil interface flow conditions can be most readily achieved by allowing co-current flow of foam and liquid, in a channel which has a gently inclined planar lower surface leading to a liquid removal trough adjoining the planar surface, the level of liquid in the trough being maintained at about the level at which the planar surface adjoins the trough, thereby avoiding a waterfall which might entrain bubbles.

DESCRIPTION OF THE PREFERRED EMBODIMENTS

Brief Description of the Drawings

FIG. 7 is a schematic side elevation detailing the configuration of the trap in a liquid removal line and its relationship to the flow channel and liquid collection trough.

FIG. 8 is an isometric schematic view illustrating a single flow channel.

FIG. 9 is a schematic sectional view detailing operation of the liquid-foam separation area of a single flow channel.

Figure 1:
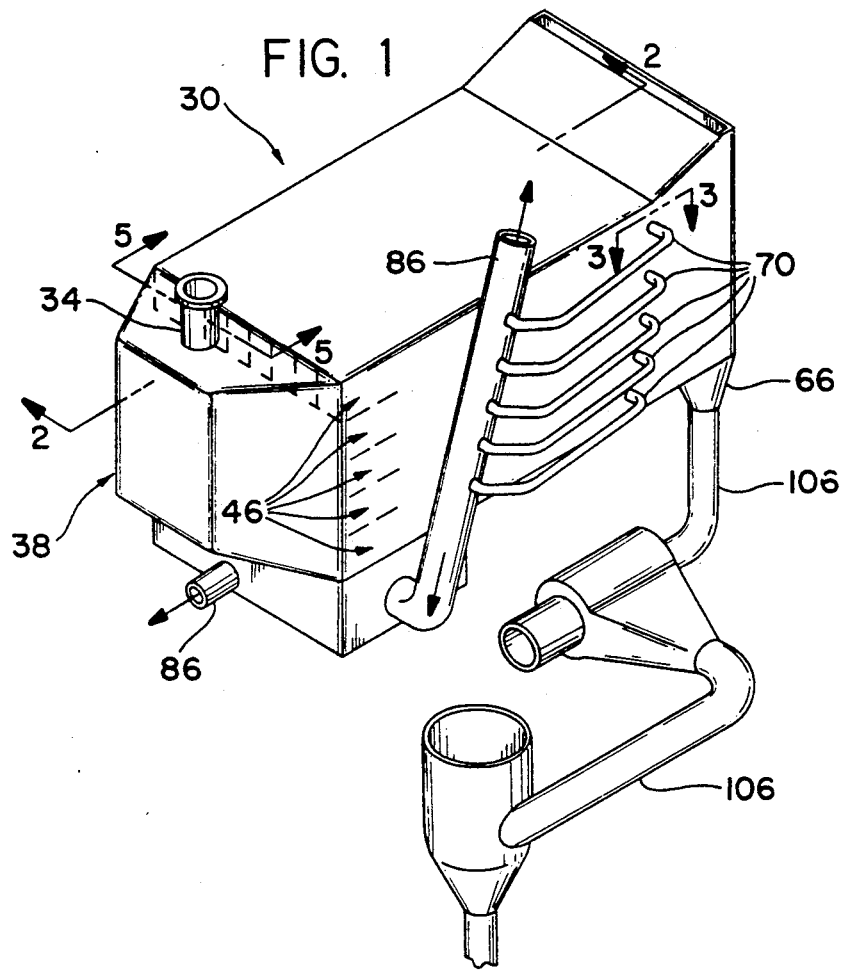
FIG. 1 is a schematic overall isometric view of a separation apparatus incorporating several stacked drainage channels.

While the method and apparatus of the present invention may be used for extracting surfactant depleted liquid from any wet, moderately stable foam, they are especially suitable for use in recycling foam from a papermaking machine as described in commonly assigned co-pending U.S. application Ser. No. 07/599,149 for letters patent of John H. Dwiggins and Dinesh M. Bhat filed Oct. 17, 1990, entitled Foam Forming Method and Apparatus, the disclosure of which is incorporated herein by reference. The method and apparatus of the present invention are suitable for extracting interstitial liquid from the wet foam generated in the forming loop. Surfactant enriched foam can be resolved then returned to the papermaking process while surfactant depleted liquid may be further treated in the surfactant recovery system described in co-pending, commonly assigned U.S. application Ser. No. 07/598,995 for letters patent of Dinesh M. Bhat filed Oct. 17, 1990, entitled Recovery of Surfactant from Papermaking Process, the disclosure of which is incorporated herein by reference.

By "wet, moderately stable foam," we mean any admixture of air, water and surfactant containing at least 50% air by volume which, if left undisturbed in a typical one liter graduated cylinder will retain at least 90% of its volume for at least about three minutes while a measurable quantity of liquid drains therefrom. Throughout this specification, percentage air contents should be understood to be in percent by volume unless otherwise specified.

As shown in the figures, an apparatus suitable for carrying out the practice of the present invention on a scale suited for recycling foam from a papermaking process may take the form illustrated in the figures in which liquid separation unit 30 comprises a foam supply conduit 34 opening into manifold 38 separated by valve mechanisms 42 from a plurality of stacked channels 46 defined by sidewalls 50 and plates 54, which are very gently inclined downwardly (preferably at about 0.5% to 1.0% slope) toward liquid removal trough 58. So long as it is not so excessive as to lead to bubble-entraining interfacial turbulence or flooding, the slope is a matter of convenience and may be either positive or negative or even essentially horizontal although some negative slope is preferred to avoid accumulation of surfactant and fiber during shutdown. For convenience in construction, all base plates except the two defining the bottom of the lowest channel and the top of the highest can serve as the bottom of one channel and the top of the channel below it. Subsequent to trough 58, base plate 54 inclines upwardly to lip 62; the lip 62 for each channel being higher in elevation than the top of that channel which is defined by the base plate 54 of the channel above it, each lip also being spaced further from manifold 38 than the lip of the base plate below it so that foam overflowing the lip of each channel falls into foam collection plenum 66 without disturbing the foam in lower channels. Each liquid collection troughs 58 leads to its respective liquid outlet line 70 which has trap 74 defined therein by bubble disentrainment leg 78 having a gentle downward slope of approximately 5-10° and by level maintenance leg 82 opening into liquid removal duct 86 at a level which is appropriate to (i) prevent passage of foam through liquid removal duct 86, and liquid outlet line 70 into channel 46; and (ii) also to ensure that sufficient liquid level is maintained in bubble disentrainment leg 78 to allow buoyant forces to remove bubbles (not shown) effectively from the liquid in bubble disentrainment leg 78. Preferably, a moderate flow velocity having a vertical component of less than about 4 cm/sec is maintained through each liquid outlet line to allow entrained bubbles as small as 0.25 mm to escape more effectively while ensuring that foam 90 is not drawn into liquid removal duct 86 by the venturi effect or siphoning. Comparable results can be achieved by substituting flow resistance for the trap but the value of the resistance can be rather critical. In either case, the length of the disentrainment leg should preferably be sufficient to allow 0.25 mm bubbles to rise through the height of a vertical section of the leg.

In operation, foam 90 is introduced through foam supply line 34 to manifold 38 of liquid separation unit 30 joining a plurality of flow channels 46 stacked one above another, the flow of foam 90 to each channel being controlled by sliding gates 42. Liquid depleted in surfactant drains from foam 90 in each flow channel 46, collects in liquid collection trough 58 whence it flows through bubble separation region 78 in trap region 74 of liquid return line 70 opening into liquid return duct 86 which is open to the atmosphere. Drained foam flows over liquid collection trough 58 through rising section 98 of flow channel 46 then at atmospheric pressure spills over lip 62 into foam collection plenum 66 connected to foam return duct 106

As mentioned, maintaining the proper flow conditions in each flow channel is key to achieving a successful extraction of relatively surfactant depleted liquid from relatively surfactant enriched foam.

After foam 90 enters each channel 46 and passes through transitional entrance region 110 at the beginning of each channel 46, flow of foam should be substantially translational by which we mean that the foam should move through channel 46 without further rearranging itself once it leaves transitional entrance region 110. Thus, each bubble in foam 90 will have approximately the same location relative to the other nearby bubbles in the foam after it leaves transitional entrance region 110 as it will when it passes over liquid collection trough 58.

One way of promoting translational flow is to provide a substantially constant flow of foam through a positive displacement pump (not shown) connected to the channel at one end through a variable flow restrictor with the other end of the channel being open to the atmosphere, thereby controlling flow rate and residence time more directly.

The rate at which foam is passed through each operational channel 46 should be such that foam 90 will reach the desired recycle concentration but will not be overdried before it reaches the end of channel 46 and flows over lip 62 into foam collection plenum 66. For papermaking applications using AOS as the surfactant, a concentration of at least about 500 ppm to 600 ppm by weight is usually most suitable. For each particular foam and surfactant combination (characterized primarily by air content, surfactant identity and concentration, bubble size distribution, water composition, and the like), the time required for a column of foam of a particular height to reach a desired air content can be easily determined experimentally by observing drainage of a column of that foam of the same height in a graduated cylinder and recording the volume of liquid and foam as a function of time. The time required for overdrying is determined by noting the time at which coalescence begins. These times agree remarkably well with the residence times yielding the specified air contents or overdrying of that foam as it translates through a drainage channel. It is important to recognize that the degree of extraction obtainable before onset of over-drying and coalescence is a function of the height of the foam layer being drained and that drainage performance decreases with increasing channel height. For a given bubble size distribution, an 8" channel requires about 20% more residence time than a 6" channel, to reach a 600 ppm surfactant concentration in the outgoing foam (for one particular foam, we observed 7.6 vs. 9.0 min. for 63% ingoing air content). However, in the 8" channel, the average concentration of surfactant in the foam will be higher at the onset of overdrying than in the 6" channel. Many times, satisfactory results can be achieved in 6" to 8" channels using residence times of between 6 and 15 minutes, preferably between 7 and 12 minutes.

The process of the present invention is particularly suitable for use with foamable admixtures of an aqueous solution of anionic surfactant, such as an alpha olefin sulfonate available from Witco Corp., N.Y., under the tradename Witconate AOS which may be used to produce a satisfactory aqueous foam for papermaking at a preferred concentration in the range of from about 150 ppm to about 350 ppm by weight. A number of surfactants suitable as a water additive for purposes of the present invention are available on the market, being generally classified a nonionic, anionic, cationic, or amphoteric surfactants. The surfactant concentration usually will be in the range of 150 to 1000 ppm by weight.

As used herein, the term "resolving" means the removal of a substantial portion, or all, of the gaseous component from the foam as distinguished from "drainage" in which a substantial portion of the liquid is removed from the foam without removing a substantial portion of the gaseous component. Thus, a "resolved foam" may contain no gas or it may still contain relatively large amounts of gas. In foam resolving or resolution, it is usually intended to rupture bubbles contained in the foam so that the gas contained therein may be separated from the admixture of gas and liquid, while in drainage, it is usually intended that bubbles are only minimally disturbed at most so that surfactant-depleted liquid may be removed therefrom. By "separation" or "separating", we mean physically moving or transporting the foam or lighter portions of it away from the liquid or dense phase, or alternatively, of course, physically moving or transporting the liquid or dense phase away so that liquid does not drain into the dense phase from the foam. The term "admixture" as used herein is intended to include all aggregations of more than one component whether multi phase or single phase, a solution, dispersion, colloid, suspension, foam, emulsion, froth, physical mixture, or other structure. As used herein "fibrous web forming process" should be understood broadly to include wet forming of paper or nonwovens, as well as auxiliary processes such as, for example, pulping, repulping, showering, washing, deinking, fiber recovery, padding, additive impregnation, coating, drying, dewatering and the like.

The basis for design of each channel of an apparatus of the present invention resides in the principle that drainage during horizontal, translational foam flow approaches ideal static column drainage behavior. That is, the time required to drain a foam layer to a given air content target is relatively independent of whether that layer is at rest or moving translationally in a horizontal path. We have found that the liquid drainage velocity through the foam just above the drained liquid is relatively insensitive to the total depth of the foam layer; thus, a shallow foam layer reaches a given Air Content (A.C.) target more quickly than does a deep one. Data from static columns having initial foam heights in the range from 3 to 19 inches show that the time needed for foam having 68% air content to drain to the surfactant concentration level suitable for use in the above mentioned papermaking forming loop foam (88% air content or 600 ppm AOS by weight) increases in proportion to initial foam height raised to a fractional positive power, usually in the range of from about 0.58 to about 0.70 for the foams described herein. In particular, a 6 inch foam column attains the target air content in about 5 to 7 minutes. To handle commercial flow rates, multiple channels of relatively small height (e.g., of 6 to 8 inches) will usually be preferred. The channels can be stacked for convenience.

CHANNEL DESIGN

In order to design or size a channel for some nominal input and output conditions and predict its performance through a range of operating conditions, it is necessary to be able to predict the effect on outgoing foam and liquid surfactant concentrations ($y_{f out}$, $y_{l out}$) of: (i) ingoing foam conditions; (ii) residence time of the foam in the channel (drainage time), and (iii) channel height ($h_f$). Because the rate of the drainage process is most readily understood in terms of air content of the outgoing foam ($AC_{out}$), this variable is used to characterize the drainage process and the outlet concentrations. That is, the input variables, foam flow rate and properties, along with channel geometry, are used to predict $AC_{out}$ and, in turn, $y_{f out}$ and $y_{l out}$ are determined by $AC_{out}$.

The majority of the experimental data relied upon in these sections pertain to foam generated by a pilot high speed paper machine operated as described in U.S. Pat. No. 4,543,156 in the crescent forming mode with a fine (94×132 mesh) forming/drainage wire, the furnish comprising an admixture of cellulosic fibers, air, water and the above described AOS surfactant. Other foams we investigated behaved in a similar fashion as their drainage behavior could be adequately predicted based upon static drainage test.

It is useful to review some of the key foam terminology and concepts for wet foam prior to considering the criteria for proper design of a channel. Foam comprises air bubbles (usually with a distribution of diameters) stabilized with a surfactant-rich layer at the interfaces with surrounding liquid. Interstitial liquid of a lower surfactant concentration acts as the source of surfactant for bubble stabilization during foam generation. Background on foam phenomena can be found in Lemlich, R. (Editor), *Adsoroti ve Bubble Separation Techniques*, (Chapters 2 and 3, Academic Press, New York (1972).

Channel performance and required size depends strongly on the drainage and surfactant concentration characteristics of the foam supplied, principally determined by surfactant concentration, inlet foam air content and bubble size distribution (BSD). In turn, the BSD and air content depend on paper machine speed, surfactant identity and concentration and the geometry of the forming wire mesh and forming method.

The interstitial liquid surfactant concentration in the ingoing foam is first measured by collecting a foam sample in a graduated cylinder, allowing partial drainage to occur, then removing a portion of that liquid from the bottom of the cylinder for surfactant concentration analysis.

We have found that linear equations can often be used to correlate air content of the foam and interstitial surfactant concentration over air content ranges between 55% and 75%. Given the bubble size distribution ("BSD"), it is of course possible to calculate directly the interstitial surfactant concentration from the BSD and the collapsed foam surfactant concentration ($y_f$).

A simple conceptual picture of wet foam comprising spherical bubbles having an equilibrium amount of surfactant per unit interfacial area ($m_s''$)* and a volume of interstitial liquid at a surfactant concentration ($y_l$) leads to a relationship between collapsed foam surfactant concentration ($y_f$) and interstitial liquid concentration ($y_l$):

* For AOS: $m_s'' = 9 \times 10^{-5}$ mg/cm$^2$.

$$y_f = y_l + \eta \frac{[6 \alpha m_s'']}{[(1-\alpha)\overline{D}]} \qquad 1.$$

where
α = air volume fraction
$\overline{D}$ = mean bubble diameter
η = correction factor for non-uniform bubble size (η=1 when all bubbles have the same diameter, $\overline{D}$)

In connection with Equation 1, the fundamental relation for η is:

$$\eta = \overline{A}\,\overline{D}/(6\overline{V}) = \overline{D^2}\cdot\overline{D}/\overline{D^3} \qquad 2.$$

where:
$\overline{A}$ = mean surface area of a bubble
$\overline{V}$ = mean volume of a bubble If the bubble size (diameter) distribution (BSD) function, f(D), is known, it can be used to calculate $\overline{D}$, $\overline{D^2}$, $\overline{D^3}$ from the definition:

$$\overline{D^n} = \int_0^\infty D^n f(D)\,dD;\; n = 1,2,3 \qquad 3.$$

Then, η is readily calculated from Equation 2.

It is convenient to define a bubble size distribution parameter, γ, representative of foam characteristics and behavior as:

$$\gamma = 6\,m_s''\eta/\overline{D} = BSD\ parameter, \qquad 4.\ \text{for a given surfactant}$$

Then, Equation 1 can be rewritten as:

$$\gamma = (y_f - y_l)(1-\alpha)/\alpha \qquad 5.$$

Thus, γ can be calculated in two independent ways, using concentration vs. air content data or using BSD data.

FOAM DRAINAGE CHARACTERISTICS

The drainage time required for the foam to reach a target surfactant concentration (and corresponding air content) plays a direct role in determining the channel volume needed to handle a given throughput. Because the horizontal flow in the channel is largely decoupled from the vertical drainage, drainage rate relationships from "static" experiments (i.e., drainage of foam in a graduated cylinder) are a good indicator of drainage in a "dynamic" situation (such as occurs in a channel). Conceptually, the difference between drainage in a constant height channel and static drainage is that the foam height in the static case decreases with time. A related phenomenon in channel drainage is that the horizontal foam flow velocity decreases with distance along the flow direction. Both of these characteristics are due to separation of liquid from the foam and the concomitant shrinkage of that foam volume associated with every group of bubbles. Consequently, the drainage vs. time behavior of static and dynamic systems agree very well when the time-averaged static foam height equals the channel height and when the residence time in the channel (drainage time) is based on average flow velocity rather than the inlet velocity. However, it is far more convenient (and essentially equivalent) to associate a static system whose initial height is the same as the channel height with a dynamic system whose residence time based on initial (ingoing) foam flow rate is the same as the static drainage time. This method of comparison will be used exclusively in the remainder of the present application.

A source of potential deviation of dynamic drainage behavior from "ideal" static behavior is departure from translational, non-rearranging flow through the channel, due to wall effects, poor inlet flow distribution, drag forces on the foam from the drained liquid layer and the like. Experimental work on small-scale channels appeared to exhibit some of these non-ideal effects, causing the unit to require a few more minutes for the foam to reach a particular air content target than the time needed for static foam to reach the same target. Experience with larger channels (4' wide ×6" deep ×20' as well as 23' long) has shown good agreement between static and dynamic behavior.

Because foam drainage involves a relative velocity between liquid and bubbles, one might expect the BSD and air content to influence drainage rate. Analogy between liquid flow through a "matrix" of bubbles and flow through a bed of solid spheres, indicates the relevant BSD parameter to be $(\overline{D}\eta)^2$, as mentioned earlier, with larger $(\overline{D}\eta)^2$ yielding larger drainage rate. Experimental static drainage data are in reasonable agreement with this expectation.

Drainage rate (in terms of rate of change of average air content) decreases with increasing foam height for both static and dynamic systems.

Static drainage data indicate that the drainage rate (or rate of change of air content) decreases as the foam becomes drier. A simple, and physically reasonable, model of such behavior is the 1st-order response equation:

$$\alpha = 1 - (1-\alpha_{in})exp\,(-\tau/\tau_o) \qquad 6.$$

where:
α = air volume fraction = A.C./100
$\alpha_{in}$ = ingoing air fraction
$\tau_o$ = time constant, dependent on BSD, $\alpha_{in}$ and foam (channel) height ($h_f$)
τ = time Accordingly, a semi-log plot of the foam water fraction (1−α) vs. time should be a straight line whose slope is related to $\tau_o$. Our experimental results imply that Equation 6 is an adequate model for drainage.

For the important case where $\tau = \tau_{RES}$, the channel residence time, Equation 6 predicts the outgoing foam air content, $\alpha = \alpha_{out}$. For most applications, several trays defining parallel channels will be stacked to form a unit referred to as a horizontal drainage unit or HDU. Here, residence time is related to total HDU channel volume ($V_T$) and actual foam inflow rate ($Q_{fin}$) by:

$$\tau_{RES} = V_T/Q_{fin} \qquad 7.$$

Two additional relationships, related to Equation 6, need to be considered:

$$V_T = LWh_f N_c \qquad 7a.$$

and $$U_{in} = L/\tau_{RES} \qquad 7b.$$

where:
L = length of an HDU channel
W = width of an HDU channel
$h_f$ = channel (foam) height $N_c$ = number of parallel HDU channels
$U_{in}$ = foam velocity in HDU channel at inlet end While Equations 6, 7 and 7a suggest that any combination of channel dimensions (yielding a given total volume) is as good as any other for attaining a given air content, different configurations would require different foam flow velocities (Equation 7b). In particular, long narrow channels would require higher velocity than short, wide ones. In the extreme, the velocity could become high enough that the flow is not translational and thus the foam does not drain like a static column. Higher velocities still can lead to turbulence or coalescence increasing the concentration of surfactant in the underflow. For our experiments presented here, we used channel lengths of 20 and 23 ft., with velocities that were always less than 5 ft./min. Direct visual observation of the foam flow in the upstream portion of the channel confirmed its non-rearranging, translational plug-like behavior. This, with the good agreement between static and dynamic drainage, suggests that velocity effects were unimportant for the range of velocities experienced.

Static drainage results for a range of initial foam heights, can be correlated on the basis that the residence time, $\tau_o$, required for a column to drain to a specified air content is proportional to a positive fractional power of the height. For our data, the dependence of $\tau_o$ on $AC_{in}$ and $h_f$ is adequately described by the relationships:

$$\tau_o = \tau_{o6}(h_f/(6 * 2.54))^{0.58} \qquad 8.$$

where:
$h_f$ = foam (channel) height, cm.
$\tau_{o6}$ = time constant for 6" foam (channel) height $$\tau_{o6} = 4.6 + 0.275 \, (AC_{in} - 57.) - 9.722 \times 10^{-3} \, (AC_{in} - 57)^2 \qquad 9.$$

for $\tau_{o6}$ in minutes.

OUTGOING FOAM CHARACTERISTICS

A typical design goal is to achieve a specified target value (e.g., 600 ppm) for the collapsed foam surfactant concentration ($y_{f\,out}$) in the outgoing foam. For sizing the channel, one must know how $y_{f\,out}$ depends on $AC_{in}$ and on $AC_{out}$. Then, one can use Equations 6-9 to determine the required channel volume (or residence time).

Under ideal circumstances, the foam BSD and $\gamma$ value (Equations 4 and 5) and interstitial liquid surfactant concentration ($y_l$) do not change appreciably (e.g., no coalescence of bubbles occurs) between the inlet and outlet of the HDU. In this case, the ideal concentration ($y_{f\,out,\,ideal}$) can be calculated by applying Equation 5 to the ingoing foam ($\alpha_{in}$, $y_{f\,in}$, $Y_{l\,in}$ all known) to determine $\gamma$ and then re-applying Equation 5 (for the same $\gamma$ value and same interstitial liquid surfactant concentration, $y_l$ in) to establish the relation for $y_{f\,out,\,ideal}$:

$$y_{f\,out,\,Ideal} = y_{l\,in} + \gamma \, (\alpha_{out})/(1 - \alpha_{out}) \qquad 10.$$

where: $\alpha_{out} = AC_{out}/100$
$\qquad\qquad\quad$ = outgoing foam air fraction Comparisons between predicted $y_{f\,out,\,ideal}$ and actual measured concentration in the outgoing foam can be used to determine the onset and extent of coalescence. The "coalescence function" (F) can be related to the deviation between actual and ideal behavior by the definition:

$$y_{F\,out} = y_{F\,out,\,ideal}\,(1-F) \qquad 11.$$

Coalescence was not very extensive in the foams investigated; F values never exceeded 0.15, even at low $AC_{in}$ (57%) and high $AC_{out}$ (94-95%). However, coalescence can be significant in foams with high air contents and wide bubble size distributions and if care is not taken to avoid overdrying.

However, an empirical correlation of the limited F values was developed as:

$$\begin{aligned} F &= \text{Max}\,(0., F_1) \\ \text{where; } F_1 &= S_1\,(AC_{out} - AC_1) \\ AC_1 &= 91 + 2.5\,(AC_{in} - 57)/6 \\ S_1 &= 0.042 + (0.036 - 0.042)\,(AC_{in} - 57)/6 \end{aligned} \qquad 12.$$

Together, Equations 11 and 12 state that coalescence does not begin until $AC_{out}$ exceeds $AC_1$ (91 to 96%, depending on $AC_{in}$).

For our purposes equations 10-12 give a good description of foam surfactant concentration. The results quantify the needed air content to achieve a specified concentration (e.g., 600 ppm).

DRAINED LIQUID CHARACTERISTICS

Ideally, the drained liquid leaving the channel would have a surfactant concentration identical to that in the interstitial liquid of the ingoing foam ($y_{l\,in}$). This would result in the minimum load to downstream surfactant recovery units, for a given outgoing liquid flow rate, $Q_l$ out. Two processes could cause the concentration in the outgoing liquid ($y_{l\,out}$) to exceed $y_{l\,in}$. First, if bubble coalescence in the foam occurs, released interfacial surfactant increases the interstitial liquid concentration. Subsequent drainage of this liquid increases $y_{l\,out}$ and causes $y_{f\,out}$ to be less that $y_{f\,out,\,ideal}$. The degree of foam coalescence would depend largely on the foam initial BSD, and may not be entirely avoidable. Foams with larger $\eta$ (more uniform bubbles) exhibit less coalescence. The second process, foam entrainment during liquid removal from the channel, can be largely avoided by maintaining a tranquil interface by avoiding high liquid velocities and "waterfalls" or liquid freefall along the liquid removal path where the drained liquid is in contact with foam.

The liquid surfactant concentration for conditions of zero entrainment can be calculated from the mass-balance-based equation:

$$y_{l\,out} = \frac{\alpha_{out}\,(1 - \alpha_{in})\,y_{f\,in} - \alpha_{in}\,(1 - \alpha_{out})\,y_{f\,out}}{\alpha_{out}\,(1 - \alpha_{in}) - \alpha_{in}\,(1 - \alpha_{out})} \qquad 13.$$

For conditions where $y_{f\,out} = y_{f\,out,\,ideal}$, Equation 13 yields $y_{l\,out} = y_{l\,in}$, as it should (no coalescence). Of course, if coalescence does occur, it begins at the top of the foam layer so a finite time will be required for surfactant to reach the layer of liquid so contamination of the liquid underflow will not be immediate. At high outgoing foam air content, where coalescence can be important, $y_{l\,out}$ increases. Predicted behavior and experimental data for $y_{l\,out}$ agree well enough to be truly useful in design of a liquid separation unit employing channels designed according to these criteria.

For papermaking, it is important to know the destiny of fibers and fines entering the channel with the foam from the forming loop. If overdrying is avoided, the fibers in the liquid separation unit appear to "split" in approximately the same proportion as the liquid does. This behavior is equivalent to the consistency being uniform throughout the liquid separation unit, or:

$$C_{f\,out} = C_{f\,in} \qquad 14.$$

$$C_{l\,out} = C_{f\,in}$$

where
$C_{f\,in}$ = fiber consistency in ingoing (collapsed) foam
$C_{f\,out}$ = fiber consistency in outgoing (collapsed) foam
$C_{l\,out}$ = fiber consistency in drained liquid out For typical outflow conditions, about 80% of the incoming fibers go with the liquid.

FOAM FLOW IN A HDU CHANNEL

Two aspects of foam flow behavior were observed during single channel experiments. First, the flow, as observed in a clear plastic section of the channel at the inlet end, was very uniform and translational. Flow from the supply lines feeding the channel spread quickly, seeming to "fill the channel" in the cross-direction easily, without evidence of recirculation zones (as might have been expected for water flow). The observed flow behavior is compatible with the good agreement between static and dynamic drainage behavior.

Figure 2:
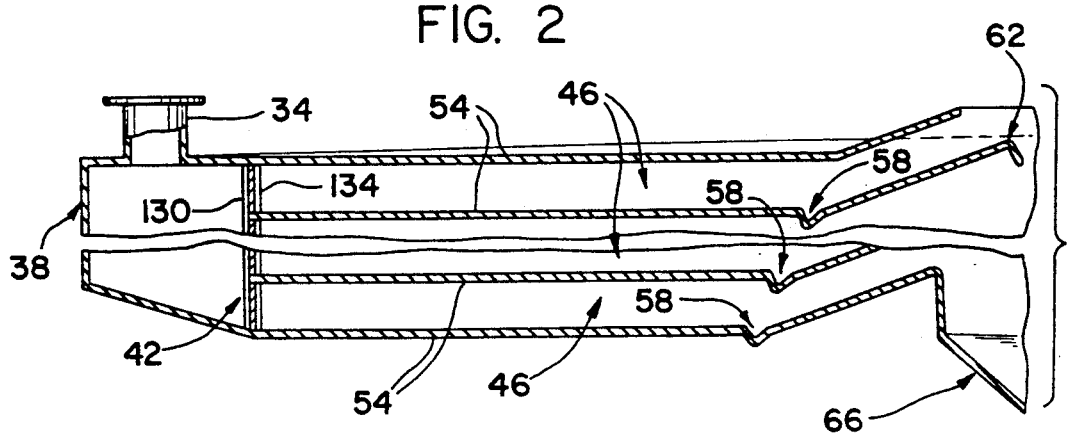
FIG. 2 is a sectional view taken along line 2—2 in FIG. 1 illustrating the configuration of the several flow channels stacked one above another.
Figure 3:
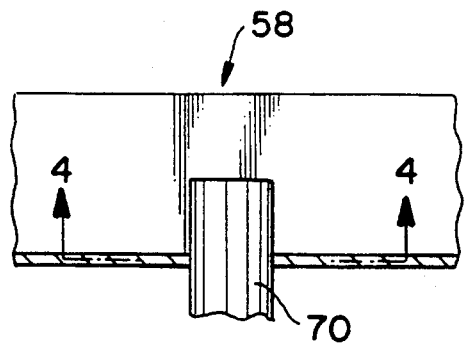
FIG. 3 is a sectional view along line 3—3 in FIG. 1 illustrating details of the region in which foam is separated from surfactant depleted liquid.
Figure 4:
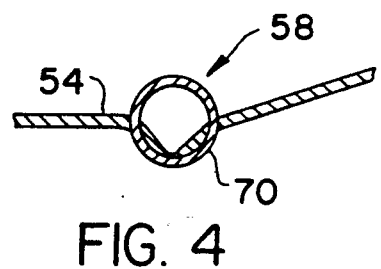
FIG. 4 is a sectional view along line 4—4 in FIG. 3 illustrating the liquid collection trough and the liquid removal line.
Figure 5:
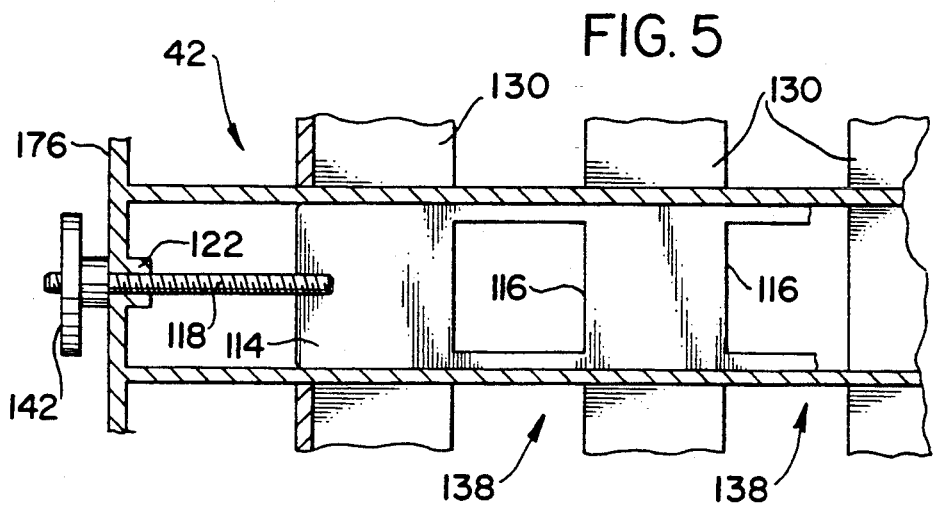
FIGS. 5 and 6 are sectional views along line 5—5 in FIG. 1 illustrating apertures and sliding shutters which control the relative flow volume to each channel, the shutters being open in FIG. 5 and closed in 6.
Figure 6:
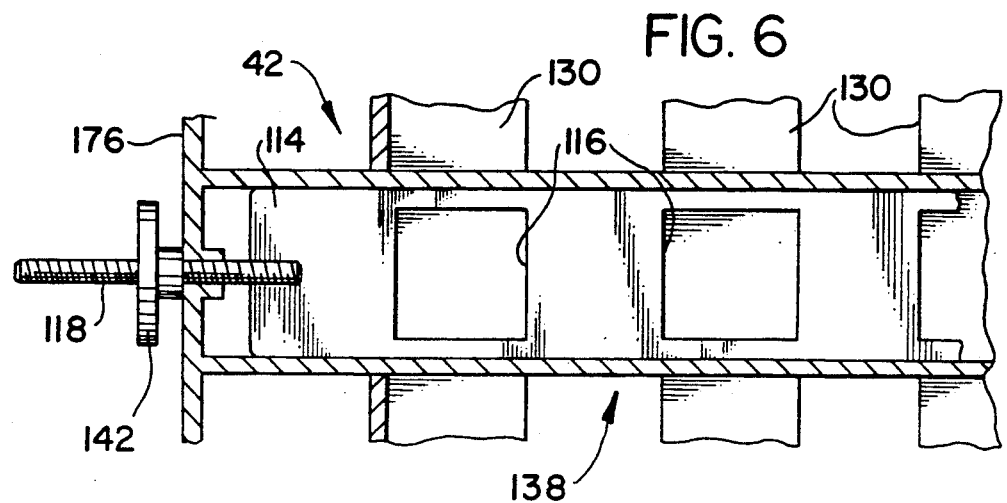

FIGS. 2, 5 and 6 illustrate a simple valve mechanism 42, one of which is placed upstream of channel 46 used to throttle flow of foam 90. By appropriately adjusting the openings to compensate for the differences in hydrostatic head, flow can be apportioned between the several channels 46. Valve mechanism 42 comprises sliding gate 114 having a plurality of apertures 116 formed into it operably connected to translation screw 118 engaging threaded bushing 122 notably mounted on manifold wall 176. Each sliding gate 114 is retained between flow control plates 130 and 134, each having communicating apertures 138 formed therein opening into each channel 46. Control wheel 142 mounted on threaded bushing 122 facilitates rotation of threaded screw 118 drawing sliding gate 114 transversely so that apertures 116 in sliding gate 114 can either be aligned with apertures 138 in flow control plates 130 and 134 as shown in FIG. 5 to allow maximum flow of foam 90 through to channel 46 or can be aligned to block flow as shown in FIG. 6. In cases where the foam flow rate is significantly less than the design capacity, it will be advantageous to block some of channels 46 off entirely to prevent overdrying.

The other flow observation was the relationship between flow velocity, pressure drop and foam characteristics (air content and bubble size distribution). The pressure drop was measured across the full 23 ft. channel length; the velocity was based on the foam inflow rate and channel flow area. The pressure drops are small (0.06 to 0.12 psi) and should not significantly influence the design or performance for a parallel channel extraction unit.

DESIGN AND PERFORMANCE

The information presented in the preceding sections and the computer model incorporating this information represent a technical basis suitable for understanding liquid separation unit performance and the influence of key equipment and operating variables.

The liquid separation unit size (volume) requirement has been found to depend on several variables: desired throughput (foam inflow rate), entering air content, foam bubble size distribution, channel height and desired (target) surfactant concentration in outgoing foam. Tables 1 and 2 indicate the required residence times (volume per unit throughput) for a representative target concentration (600 ppm) for two different bubble size distributions, the bubble size distribution of Table 1 being the finer. For a nominal ingoing air content of 62%, but a target concentration of 700 ppm, calculations show the needed residence time to increase by 13% to 17% depending on the bubble size distribution.

After establishing a reasonable total volume for the HDU, one can use the model to explore the effects of changes in throughput, ingoing air content, ingoing foam BSD on surfactant concentrations and flow rates in the outgoing foam and liquid streams. Alternative control strategies can be evaluated by comparing results for a fixed volume with those from a fixed residence time, etc. It must be noted, however, that use of the present model will characterize the performance of the "typical channel" (i.e., the one having the average flow rate) only. In practice, some variations in flow distribution (channel-to-channel) would be expected at off-design conditions, unless appropriate control schemes are employed.

EXAMPLE

Foam was drained using the method and apparatus of the present invention as follows:

Four horizontal foam drainage channels each 6" high by 48" wide and 20 feet long were stacked one above another in a lengthwise staggered arrangement so that foam exiting each channel at atmospheric pressure overflowed into a common foam collection plenum. Each channel was fed by two 3" diameter pipes, each spaced one foot from the lengthwise centerline of the channel. Foam drained from each channel through two 6" diameter round ducts, the centerline of each duct being one foot from the lengthwise centerline of the channel. Each duct was kept full and streaming out of foam prevented by elevation of the lowest portion of the outlet above the top of the channel to which it was connected. Valves in the inlet lines were used to apportion the foam flow through each channel. Motive force for the foam was provided by a positive displacement pump supplying 709 liters of foam/min (at atmospheric pressure) for a residence time of 6.4 minutes. Analysis of the inlet flow yielded 63.4% air content (by volume) with an alfa olefin sulfonate (AOS) content of 192 ppm by weight. The AOS content of the inlet interstitial liquid was 93 ppm by weight.

Drained liquid was collected in a 1½" deep ×3" wide rectangular trough formed adjacent the downstream end of each channel. Liquid was drained through a 3" diameter outlet line wherein the disentrainment leg was 12' long dropping 15¼ in that 12', the level maintenance leg being 2' long and rising 12½" over those 2 feet. A small window allowed viewing of the trough to verify that the level in the trough was at or above the bottom of the channel thus obviating concern over waterfalls. Foam leaving the channels had the following analysis:

| Channel | AOS (ppm) | Air Content (%) |
| --- | --- | --- |
| 4 (top) | 1060 | 94.6 |
| 3 | 873 | 93.1 |

| Channel | AOS (ppm) | Air Content (%) |
|---|---|---|
| 2 | 792 | 92.1 |
| 1 (bottom) | 903 | 93.1 | for an overall analysis of 93.1% air content, 900 ppm by weight of AOS at a foam flow rate of 414 liters/min. Liquid from the four trays had an AOS content of 93 ppm by weight with no entrained bubbles visible at an estimated flow rate of 226 liters/min.

TABLE 1

Estimated Residence Times* to Reach 600 ppm in Outgoing Foam

| Nominal $AC_{in}$ (%) | Required $AC_{out}$ (%) | $\tau_{res}$ (min.) $h_f = 6$ in. | $h_f = 8$ in. |
|---|---|---|---|
| 56 | 91.2 | 7.3 | 8.6 |
| 62 | 89.9 | 7.6 | 9.0 |
| 68 | 89.0 | 6.7 | 7.9 |

*Based on uncollapsed foam inflow rate.

TABLE 2

Estimated Residence Times* to Reach 600 ppm in Outgoing Foam,

| Nominal $AC_{in}$ (%) | Required $AC_{out}$ (%) | $\tau_{res}$ (min.) $h_f = 6$ in. | $h_f = 8$ in. |
|---|---|---|---|
| 58 | 95.9** | 9.0** | 11.0** |
| 62 | 91.9 | 6.8 | 8.4 |
| 68 | 87.9 | 5.0 | 6.2 |

*Based on uncollapsed foam inflow rate.
**Extrapolation, not supported with experimental data.

As our invention, we claim:

1. A method of separating surfactant depleted liquid from an at least partially stable foamed aqueous admixture of water, surfactant and air, comprising the steps of:
   a) introducing said at least partially stable foamed admixture to a channel of preselected height, length, width and inclination at such a flow rate that as said foamed admixture passes through said channel:
      i) substantially translational motion of said foamed admixture is maintained through the bulk of said channel;
      ii) as said foamed admixture translates through said channel, surfactant depleted liquid drains from the interstices thereof, the air content of said foamed admixture not increasing above the air content at which substantial overdrying begins to occur in said foamed admixture;
      iii) tranquil interface flow conditions are maintained in the flow of surfactant depleted liquid drained from said foamed admixture for so long as it is in contact with said admixture; and
   b) separating said surfactant depleted liquid from said foamed admixture prior to the onset of substantial coalescence in the foamed admixture.

2. The method of claim 1 comprising the additional step of separating entrained air bubbles from the surfactant depleted liquid and returning said entrained air bubbles to said foamed admixture.

3. The method of claim 2 wherein said separation of liquid from said foamed admixture is carried out at a pressure which is substantially equal to atmospheric pressure plus the head induced by the height of the foamed admixture in the region in which said separation occurs.

4. The method of claim 1 wherein the flow rate and the preselected height, length, width and inclination of the channel are such that an air content of from at least about 86 to about 90% by volume is obtained in the dried foam.

5. The method of claim 1 wherein the flow rate and the preselected height, length, width and inclination of the channel are such that an air content of between about 91% and 94% is obtained in the dried foam.

6. The method of claim 1 wherein the flow rate and the preselected height, length, width and inclination of the channel are such that an air content of between about 86% and 94% is obtained in the dried foam.

7. The method of claim 1 wherein prior to introduction into said channel, said at least partially stable foamed admixture is formed by turbulent flow of a foamable admixture of air, surfactant and water.

8. The method of claim 1 wherein prior to introduction into said channel, said at least partially stable foamed admixture is mixed by turbulent flow thereof.

9. The method of claim 1 wherein a multiplicity of channels are provided and said flow is directed through preselected ones of said channels to maintain a residence time in each channel such that an air content of from at least about 86% to about 90% by volume is obtained in the dried foam separated from the surfactant depleted liquid in each channel.

10. A method of separating surfactant depleted liquid from an at least partially stable foamed aqueous admixture of water, surfactant and air, comprising the steps of:
    a) introducing said at least partially stable foamed admixture to a channel of preselected height, length, width and inclination at such a flow rate that as said foamed admixture passes through said channel;
       i) substantially translational motion of said foamed admixture is maintained through the bulk of said channel;
       ii) as said foamed admixture translates through said channel, surfactant depleted liquid drains from the interstices thereof, the air content of said foamed admixture not increasing above the air content at which substantial overdrying begins to occur in said foamed admixture;
       iii) tranquil interface flow conditions are maintained in the flow of surfactant depleted liquid drained from said foamed admixture for so long as it is in contact with said admixture; and
    b) separating said surfactant depleted liquid from said foamed admixture prior to the onset of substantial coalescence in the foamed admixture, said separation of liquid from said foamed admixture being carried out at a pressure which is substantially equal to atmospheric pressure plus the head induced by the height of the foamed admixture in the region in which said separation occurs; and
    c) separating entrained air bubbles from the surfactant depleted liquid and returning said entrained air bubbles to said foamed admixture; said flow rate and preselected height, length, width and inclination of the channel being such that an air content of at least about 85% by weight is obtained in the dried foam.

11. The method of claim 10 wherein the flow rate and the preselected height, length, width and inclination of the channel are such that an air content of between about 86% and 90% is obtained in the dried foam.

12. The method of claim 10 wherein prior to introduction into said channel, said at least partially stable foamed admixture is formed by turbulent flow of a foamable admixture of air, surfactant and water.

13. The method of claim 10 wherein prior to introduction into said channel, said at least partially stable foamed admixture is mixed by turbulent flow thereof.

14. The method of claim 10 wherein a multiplicity of channels are provided and said flow is directed through preselected ones of said channels to maintain a residence time in each channel such that an air content of from at least about 86 to about 94% by volume is obtained in the dried foam separated from the surfactant depleted liquid in each channel.

15. The method of claim 10 wherein a multiplicity of channels are provided and said flow is directed through preselected ones of said channels to maintain a residence time in each channel such that an air content of at least about 85% by volume is obtained in the dried foam separated from the surfactant depleted liquid in each channel.

16. Liquid separation apparatus adapted to separate wet foam into a first layer of less dense dry foam relatively enriched in surfactant and a second layer comprising a more dense, generally unfoamed, liquid underflow relatively depleted in surfactant, and adapted to separate said first and second layers from each other prior to the onset of substantial coalescence in the first layer, said apparatus comprising a covered liquid separation tray defining a flow channel, said tray having first and second ends, a length, and a width, and comprising a bottom wall, upstanding side walls extending upwardly from said bottom wall, and a top wall covering said tray and extending along said length and said width of said tray, the combination of said bottom wall, said top wall, and said upstanding side walls comprising a receptacle, said receptacle being adapted to contain dry foam, said tray comprising (i) a dry foam outlet opening above said top wall for discharging said first layer from said tray, (ii) a liquid discharge port adjacent the intersection of said bottom wall and one of said side walls, (iii) means defining a liquid collection trough formed in said bottom wall adjacent said liquid discharge port, (iv) means for preventing passage of foam through said liquid discharge port, and (v) a wet foam inlet opening at said first end of said tray, said receptacle having an interior height, said interior height being no more than about 10 inches.

17. Liquid separation apparatus as in claim 16, said maximum interior height being no more than about 8 inches.

18. Liquid separation apparatus as in claim 17 wherein a plurality of said covered liquid separation trays defining flow channels are provided, said trays being stacked one above another.

19. Liquid separation apparatus as in claim 16 wherein a plurality of said covered liquid separation trays defining flow channels are provided, said trays being stacked one above another.

20. Liquid separation apparatus as in claim 16 and including valve means adapted to control volumetric rate of flow of wet foam into said covered tray at said wet foam inlet opening.

21. Liquid separation apparatus as in claim 16, and including means supporting said covered tray at such an angle that said second layer flows to said liquid discharge means while maintaining tranquil interface flow of said second layer.

22. Liquid separation apparatus as in claim 21, said wet foam inlet opening being disposed at said first end of said tray, said liquid discharge opening and said dry foam outlet opening being disposed towad said second end of said tray, said liquid discharge port and said means defining said liquid collection trough in said bottom wall being adapted to support tranquil interface flow of the liquid.

23. Liquid separation apparatus as in claim 21, said apparatus comprising liquid discharge means comprising a removal means for removing liquid discharged from said liquid discharge post, and an enclosed liquid conveyance means connecting said tray, at said liquid discharge post, with said removal means, said enclosed liquid conveyance means comprising a liquid trap, said liquid trap being adapted to fill with liquid, and thereby close said enclosed liquid conveyance means at said liquid trap, whereby elements of said first layer are prevented from reaching said removal means, and including a vent opening, venting said liquid discharge means, said liquid trap being disposed between said vent opening and said liquid discharge opening.

24. Liquid separation apparatus as in claim 16, said apparatus comprising liquid discharge means comprising a removal means for removing liquid discharged from said liquid discharge post, and an enclosed liquid conveyance connecting said tray, at said liquid discharge port, with said removal means, said enclosed liquid conveyance comprising a liquid trap, said liquid trap being adapted to fill with liquid, and thereby close said enclosed liquid conveyance at said liquid trap, whereby elements of said first layer are prevented from reaching said removal means, and including a vent opening, venting said liquid discharge means, said liquid trap being disposed between said vent opening and said liquid discharge opening.

25. Liquid separation apparatus as in claim 16, wherein said foam outlet opening is open to the atmosphere whereby said foam outlet opening maintains ambient pressure at said second end of said tray.

26. Liquid separation apparatus as in claim 16, further comprising means for maintaining the flow rate of foam through said channel at such a rate that as said foamed admixture passes through said channel:
   i) substantially translational motion of said foamed admixture is maintained through the bulk of said channel;
   ii) as said foamed admixture translates through said channel, surfactant depleted liquid drains from the interstices thereof, the air content of said foamed admixture not increasing above the air content at which substantial overdrying begins to occur in said foamed admixture;
   iii) tranquil interface flow conditions are maintained in the flow of surfactant depleted liquid drained from said foamed admixture for so long as it is in contact with said admixture.

27. Liquid separation apparatus as in claim 26, further comprising means for separating entrained air bubbles from the surfactant depleted liquid and returning said entrained air bubbles to said foamed admixture, and wherein said flow rate and preselected height, length, width and inclination of the channel are such that an air content of at least about 85% by volume is obtained in the dried foam.

28. Liquid separation apparatus as in claim 16 wherein said angle is adapted to separating wet foam, comprising from about 55 to about 70% air content by volume to obtain a first layer of dry foam comprising from about 86% to about 94% air content by volume, at steady state operating conditions maintaining substantially translational flow of said foam between said first and second ends, at a residence time in said tray of between about 6 minutes and about 15 minutes.

29. Liquid separation apparatus as in claim 22, the ratio of said length to said height being more than about 20/1.

30. Liquid separation apparatus as in claim 16, said liquid separation apparatus being configured and adapted to maintain tranquil interface flow of said second layer, such that additional foam is not entrained therein.

31. Liquid separation apparatus as in claim 17, said liquid separation apparatus being configured and adapted to maintain tranquil interface flow of said second layer, such that additional foam is not entrained therein.

32. Liquid separation apparatus adapted to separate an at least partially stable wet foamed admixture into a first layer of less dense dry foamed liquid relatively enriched in surfactant and a second layer of more dense, generally unfoamed, liquid relatively depleted in surfactant, and to separate said first and second layers from each other prior to the onset of substantial coalescence in the first layer, said apparatus comprising:

a covered liquid separation container, said container having first and second opposing ends, a length, and a width, and comprising a bottom wall, and upstanding side walls extending upwardly from said bottom wall, and a top wall covering said container and extending along said length and said width of said container, the combination of said bottom wall, said top wall, and said upstanding side walls defining a channel, said channel being adapted to contain said foamed admixture between said top wall, said bottom wall, and said upstanding side walls, said container comprising a wet foam inlet opening disposed toward said first end thereof, a dry foam outlet opening, open to ambient pressure, for discharging said first layer, a liquid discharge opening, and means for maintaining the flow rate of foam through said channel at such a rate that as said foamed admixture passes through said channel:

i) substantially translational motion of said foamed admixture is maintained through the bulk of said channel;

ii) as said foamed admixture translates through said channel, surfactant depleted liquid drains from the interstices thereof, the air content of said foamed admixture not increasing above the air content at which substantial overdrying begins to occur in said foamed admixture;

iii) tranquil interface flow conditions are maintained in the flow of surfactant depleted liquid drained from said foamed admixture for so long as it is in contact with said admixture.

* * * * *